United States Patent
Lenard

(10) Patent No.: US 7,215,760 B2
(45) Date of Patent: May 8, 2007

(54) OUTBOUND DIALING DECISION CRITERIA BASED

(75) Inventor: Rohan Lenard, Birchgrove (AU)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 11/149,617

(22) Filed: Jun. 9, 2005

(65) Prior Publication Data

US 2005/0226403 A1    Oct. 13, 2005

Related U.S. Application Data

(62) Division of application No. 10/310,499, filed on Dec. 4, 2002, now Pat. No. 7,023,980.

(51) Int. Cl.
*H04M 3/00* (2006.01)
*H04M 5/00* (2006.01)

(52) U.S. Cl. .............................. 379/266.07; 379/265.02

(58) Field of Classification Search ........... 379/265.02, 379/265.04, 265.09, 266.07, 266.08, 196–198, 379/201.01, 201.02, 201.12, 210.02

See application file for complete search history.

(56) References Cited

U.S. PATENT DOCUMENTS

| | | | |
|---|---|---|---|
| 4,817,130 A | 3/1989 | Frimmel, Jr. | |
| 4,941,168 A | 7/1990 | Kelly, Jr. | |
| 5,206,903 A | 4/1993 | Kohler et al. | |
| 5,430,792 A | 7/1995 | Jesurum et al. | |
| 5,511,112 A | 4/1996 | Szlam | |
| 5,555,376 A | 9/1996 | Theimer et al. | |
| 5,742,763 A | 4/1998 | Jones | |
| 5,802,510 A | 9/1998 | Jones | |
| 5,819,084 A | 10/1998 | Shapiro et al. | |
| 5,826,039 A | 10/1998 | Jones | |
| 5,828,747 A | 10/1998 | Fisher et al. | |
| 5,864,874 A | 1/1999 | Shapiro | |
| 5,905,793 A | 5/1999 | Flockhart et al. | |
| 5,982,873 A | 11/1999 | Flockhart et al. | |
| 6,031,896 A | 2/2000 | Gardell et al. | |
| 6,038,296 A | 3/2000 | Brunson et al. | |
| 6,088,441 A | 7/2000 | Flockhart et al. | |
| 6,094,681 A | 7/2000 | Shaffer et al. | |
| 6,128,304 A | 10/2000 | Gardell et al. | |
| 6,130,937 A | 10/2000 | Fotta | |
| 6,163,607 A | 12/2000 | Bogart et al. | |

(Continued)

FOREIGN PATENT DOCUMENTS

EP    0 886 416    12/1998

(Continued)

OTHER PUBLICATIONS

U.S. Appl. No. 10/310,499, filed Dec. 4, 2002, Lenard.

(Continued)

*Primary Examiner*—Benny Quoc Tieu
(74) *Attorney, Agent, or Firm*—Sheridan Ross P.C.

(57) ABSTRACT

A dialer for managing outgoing contacts is provided that includes a contact filtration agent 144 operable to retrieve presence information associated with a party to be contacted and determine, based on the presence information, whether or not to contact the party and, if so, when and where to contact the party.

26 Claims, 3 Drawing Sheets

U.S. PATENT DOCUMENTS

| | | |
|---|---|---|
| 6,173,053 B1 | 1/2001 | Bogart et al. |
| 6,185,603 B1 | 2/2001 | Henderson et al. |
| 6,192,122 B1 | 2/2001 | Flockhart et al. |
| 6,226,360 B1 | 5/2001 | Goldberg et al. |
| 6,298,062 B1 | 10/2001 | Gardell et al. |
| 6,307,931 B1 | 10/2001 | Vaudreuil |
| 6,330,317 B1 | 12/2001 | Garfinkel |
| 6,332,081 B1 | 12/2001 | Do |
| 6,360,222 B1 | 3/2002 | Quinn |
| 6,411,682 B1 | 6/2002 | Fuller et al. |
| 6,430,271 B1 | 8/2002 | DeJesus et al. |
| 6,449,260 B1 | 9/2002 | Sassin et al. |
| 6,463,471 B1 | 10/2002 | Dreke et al. |
| 6,477,105 B2 | 11/2002 | Aritomi et al. |
| 6,480,484 B2 | 11/2002 | Morton |
| 6,535,600 B1 | 3/2003 | Fisher et al. |
| 6,546,097 B1 | 4/2003 | Peltz |
| 6,549,612 B2 | 4/2003 | Gifford et al. |
| 6,561,805 B2 | 5/2003 | Kumar |
| 6,668,167 B2 | 12/2003 | McDowell et al. |
| 6,675,168 B2 | 1/2004 | Shapiro et al. |
| 6,700,967 B2 | 3/2004 | Kleinoder et al. |
| 6,738,462 B1 | 5/2004 | Brunson |
| 6,741,586 B1 | 5/2004 | Schuster et al. |
| 6,788,773 B1 | 9/2004 | Fotta |
| 6,789,120 B1 | 9/2004 | Lee et al. |
| 6,839,735 B2 | 1/2005 | Wong et al. |
| 6,891,933 B2 | 5/2005 | Kumamoto |
| 6,925,166 B1 | 8/2005 | Chan |
| 6,968,052 B2 | 11/2005 | Wullert, II |
| 6,968,179 B1 | 11/2005 | De Vries |
| 7,068,762 B2 | 6/2006 | Skladman et al. |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0055350 A1 | 5/2002 | Gupte et al. |
| 2002/0055975 A1 | 5/2002 | Petroyikh |
| 2002/0065894 A1 | 5/2002 | Dalai et al. |
| 2002/0076010 A1 | 6/2002 | Sahel |
| 2002/0083127 A1 | 6/2002 | Agrawal |
| 2002/0085701 A1 | 7/2002 | Parsons et al. |
| 2002/0116336 A1 | 8/2002 | Diacakis et al. |
| 2002/0116461 A1 | 8/2002 | Diacakis et al. |
| 2002/0120687 A1 | 8/2002 | Diacakis et al. |
| 2002/0126701 A1 | 9/2002 | Requena |
| 2003/0014491 A1 | 1/2003 | Hovitz et al. |
| 2003/0018720 A1 | 1/2003 | Chang et al. |
| 2003/0028621 A1 | 2/2003 | Furlong et al. |
| 2003/0073440 A1 | 4/2003 | Mukhegee et al. |
| 2005/0031107 A1 | 2/2005 | Fotta |
| 2005/0074114 A1 | 4/2005 | Fotta et al. |

FOREIGN PATENT DOCUMENTS

| | | |
|---|---|---|
| EP | 1261179 | 11/2002 |
| JP | 9-200813 | 7/1997 |
| JP | 2002-176449 | 6/2002 |
| JP | 2003-8655 | 1/2003 |
| WO | WO 00/39964 | 7/2000 |
| WO | WO 00/69140 | 11/2000 |
| WO | WO 01/55915 | 8/2001 |
| WO | WO 01/69387 | 9/2001 |
| WO | WO 02/30105 | 4/2002 |

OTHER PUBLICATIONS

Grigonis, *Computer Telephony Encyclopedia* (2000) pp. 342-345, 389-392.
MIT Project Oxygen Publications.
"Pervasive, Human-Centered Computing," MIT Project Oxygen, published by MIT Laboratory for Computer Science (May 2002).
Victor Zue, "The MIT Oxygen Project," Apr. 25-26, 2000.
Andy Zmolek; "Simple and Presence: Enterprise Value Propositions," Avaya presentation, 16 pages, presented Jan. 24, 2002.
Atkins et al "Common Presence and Instant Messaging: Message Format," Network Working Group (Jan. 9, 2003), available at http://www.ietf.internet-drafts/draft-letf-impp-cpim-msgfmt-06.txt, 31 pages.
Berners-Lee et al.; "Uniform Resource Identifiers (URI); Generic Syntax," Network Working Group, Request for Comments 2396 (Aug. 1998), 28 pages.
Bill Michael, The Politics of Naming www.cConvergence.com (Jul. 2001) pp. 31-35.
Chavez et al., "Interactive Applications of Personal Situation-Aware Assistants", Computers and Graphics, Pergamon Press LTD., Oxford, GB, vol. 23, No. 6, Dec. 1999 (Dec. 1999), pp. 903-915, XP 004187839, ISSN: 0097-8493.
Crocker et al. "Common Presence and Instant Messaging (CPIM)," Network Working Group (Aug. 14, 2002), available at http://www.ietf.internet-drafts/draft-ietf-impp-cpim-03.txt, 33 pages.
Dawson et al.; "Vcard MIME Directory Profile," Networking Group (Sep. 1998), available at http://www.ietf.org/rfc/rfc2426.txt?number=2426, 40 pages.
Day et al. "A Model for Presence and Instant Messaging," Network Working Group (Feb. 2000), available at http://www.ietf.org/rfc/rfc2277.text?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
Floding et al.; "Hypertext Transfer Proyocol - HTTP/1.1," Network Working Group, Request for Comments 2068 (Jan. 1997), 152 pages.
G. Klyne; "A Syntax for Describing Media Feature Sets," Network Working Group (Mar. 1999), available at http://www.letf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al.; "HTTP Remote Variant Selection Algorithm- RVSA/ 1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
MIT Project Oxygen, "Oxygen: Pervasive, Human-Centered Computing" MIT Laboratory for Computer Science, MIT Artificial Intelligence Laboratory (May 2002).
"Phone Mail Override for Incoming Calls", IBM Technical Disclosure Bullitin, vol. 37, No. 11 Nov. 1994.
Richard Grigonis, Computer Telephony Encyclopedia (2000) pp. 367-75.
Richard Grigonis,. Computer Telephony Encyclopedia (2000) pp. 413-30.
Richard Shockey, 'ENUM: Phone Numbers Meet the Net' www.cConveroence.com (Jul. 2001) pp. 21-30.
Rose et al.. "The APEX Presence Service," Network Working Group (Jan. 14, 2002), available at http://www.ieff.org/intemet-drafts/draft-ielf-apex-presence-06.txt, 31 pages.
Schulzrinne, H., et al., "The Session Initiation Protocol: Internet-Centric Signaling", IEEE Communications Magazine (Oct. 2000), vol. 38, No. 10, pp. 134-141.
Suagno et al, "Common Presence and Instant Messaging (CPIM) Presence Information Data Format," Network Working Group (Dec. 2002), available at http://www.lettorofinternet-drafts/draft-letf-impo-cnim-oidf-07.bct, 26 pages.
The MIT Oxygen Project, Cambridge, MA, Apr. 25-26, 2000.
XML-NS Tim Bray et al., "Namespaces in XML", W3C recommendation: xml-names, Jan. 14, 1999, 12 pages.
J. Rosenberg et al., "SIP extensions for Instant Messaging", Internet Engineering Task Force, Jul. 18, 2001, 22 pages.
G. Klyne et al., "Instant Messaging using APEX", Network working Group, Jun. 1, 2001, 19 pages.

OUTBOUND DIALING DECISION CRITERIA BASED

CROSS REFERENCE TO RELATED APPLICATIONS

The present application is a divisional of U.S. patent application Ser. No. 10/310,499, filed Dec. 4, 2002 now U.S. Pat. No. 7,023,980 to Lenard entitled "OUTBOUND DIALING DECISION CRITERIA BASED," which is incorporated herein by reference in its entirety.

FIELD OF THE INVENTION

The invention relates generally to contact centers and, more particularly, to outgoing contact handling systems for use in contact centers.

BACKGROUND OF THE INVENTION

Automated or semi-automated telephony devices or servers are commonly used in telemarketing and other types of calling campaigns to greatly speed up contact delivery, completion and performance, and increase agent productivity. Examples of semi-automated and automated telephony devices or servers include automated or pre-view dialers and predictive dialers. Automated pre-view dialers pop the number to be contacted in front of the agent before the call is made and the agent then makes the calls, usually by hitting or not hitting a key. In contrast, predictive dialers, without prior agent input, contact numbers loaded from a database and hook the agent to the contacted party when the call is answered Dialers "throw" calls to agents at pre-set speeds and set call length, agent breathing space between calls, and the maximum permissible time for an agent to handle a call. In normal operation, dialers check which telephone lines are free and which agents are free. In a typical predictive dialer, when the outgoing contact is placed a contact classifier is assigned to the contact to monitor the contact. When the contact is answered, the contact classifier determines whether a person (i.e., a live party) or something other than the person (e.g., a telephone answering machine, a busy signal, or an operator intercept) has answered the contact. If the contact classifier determines that a live party has answered the contact, control of the contact is switched immediately over to a live agent at the contact center who handles the remainder of the contact. If the contact classifier determines that the contact was not answered by a live party, the contact is terminated or alternative action is taken.

Each year, telemarketing activities are encountering more operational obstacles. Due to the intrusiveness of telemarketing activities into the privacy of the contacted parties, many governments not only closely regulate the hours during which telemarketing calls can be made and require contacted parties to be removed from telemarketing lists at the request of the contacted party but also maintain themselves or require telemarketing firms to maintain Do Not Call or DNC lists. Telemarketers must scrub their calling lists against DNC lists. Many telemarketers, however, only scrub the calling list against the DNC list at the beginning of the campaign or when the list is initially generated and therefore fail to take into account changes to the DNC list during the campaign. The general public itself is becoming less tolerant of telemarketing activities, which equates into a lower per-call success rate for telemarketing operators. Many people do not wish to receive marketing calls or only wish to receive calls on certain topics and at particular times or at particular numbers. Current practice, however, is to treat individuals as a commodity to be exploited and flood large ranges of telephone numbers with calls, resulting in the company leaving a poor impression with callees, particularly those who do not wish to receive the calls. This practice can cause an invaluable loss of goodwill in the minds of consumers. To battle the onslaught of telemarketing calls, many people have resorted to screening incoming calls manually using caller id and/or an answering machine. This practice can cause personal calls to go unanswered, leading to frustration in interpersonal relationships. Existing products can make a callback at a time specified by the party being contacted (prior to the campaign starting), or, during the campaign, in accordance with predetermined globally applied rules (for all parties) in the event of a call attempt on busy, no answer, detection of fax, etc. In the latter case, the callback is not done in accordance with the preferences of the party being contacted.

SUMMARY OF THE INVENTION

These and other needs are addressed by the various embodiments and configurations of the present invention. The present invention is directed generally to a dialer having a filtration agent that can remove arbitrary contacts from a dial list external to the dialer (and substantially immediately before dialing the removed contact). For example, the present invention can be a dialer and dialing method that use presence information to determine, for a contact on a contact list, whether or not to make the contact. "Presence" relates to the person having multiple devices with multiple communication paths and the user's preference/preferred devices and availability. "Presence information" typically refers to any information associated with a network node and/or endpoint device, such as a communication device, that is in turn associated with a person. Examples of presence information include registration information under the Session Initiation Protocol, information regarding the accessibility of the endpoint device, the endpoint's telephone number or address, the recency of use of the endpoint device by the person, recency of authentication by the person to a network component, and the preferences of the person (e.g., contact mode preferences or profiles such as the communication device to be contacted for specified types of contacts or under specified factual scenarios or presence contexts, contact time preferences, impermissible contact types and/or subjects such as subjects about which the person does not wish to be contacted, permissible contact types and/or subjects such as subjects about which the person does wish to be contacted, parties who must not contact (i.e., do not call if you are calling on behalf of XYZ company), and parties who can contact at any time (e.g., I will accept a call from the head of Company "x" regardless of what I am doing). Presence information can be user configurable, i.e., the user can configure the number and type of communication and message devices with which he or she can be contacted and to define different profiles that define the communication and messaging options presented to the incoming contactor in specified factual situations or sets of facts. By identifying a predefined set of facts, the pertinent profile can be followed to direct the contact to the user preferred device. "Contact" means a connection or request for connection between two or more communication devices. As will be appreciated, the contacts can be of various types and forms, such as voice contacts, e-mail, faxes, instant messages, paging signals, VoIP sessions, chat sessions, video conferences, multimedia multi-part messages, and cross-media messages.

In one embodiment, the present invention provides a communication process (e.g., dialing method) comprising the steps of:

(a) receiving a query for a contact;

(b) retrieving a contact from the contact list (e.g., containing first contact information), which identifies a number of parties to be contacted and corresponding contact information associated with the parties;

(c) retrieving presence information (e.g., second contact information) relating to the party associated with the contact; and (d) determining, based on the presence information, whether or not to contact the party.

The contact list has previously been filtered against a Do Not Call list. The steps are performed dynamically in the process of attempting to initiate contacts with desired parties.

A to-be-contacted queue can be employed where the presence information indicates a party's preference to receive a type of contact which includes the anticipated contact only at specified times and/or where the contact is unsuccessful and a further attempt to contact the party is desirable. The queue includes, for each enqueued entry, a corresponding data structure to temporally track when to initiate (or reinitiate) the contact.

The contact list can be updated dynamically and automatically during the contacting campaign to reflect requests of parties not to be contacted again, invalid and incorrect telephone numbers and addresses, alternate or new contact methods discovered during presence lookup, and the like.

In yet another embodiment, a dialer is provided that includes a contact filtration agent able or configured to retrieve presence information associated with a party to be contacted and determine, based on the presence information, whether or not to contact the party. The agent, based on the presence information, can further determine where (at what contact number/address) and when to contact the party. The dialer can further include one or more of a contact processor that determines when a contact is to be made, queries the contact filtration agent for a next contact, and initiates the next contact and a contact classifier operable to detect if a person has answered the contact.

The dialing method and dialer of the present invention can have a number of advantages. For example, the present invention not only, before the contact campaign is initiated, generates the contact list but also, after the contact campaign is initiated, dynamically updates the list and takes into account the preferences of the person being contacted, including their choice of communication media. The use of presence information before a contact is made can provide higher levels of customer convenience and satisfaction, honor the privacy desires of customers, and provide a higher agent success rate in effecting a live contact with the party. People can be contacted on their terms, such as at particular times or at particular numbers, without the need of agent involvement. The dynamic updating of the contact list during the contact campaign can provide faster responsiveness to a customer's needs (the customer change during a long running campaign takes effect immediately) and better agent utilization (agents are delivered to customers who are interested in talking to them and not "cold call" customers).

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
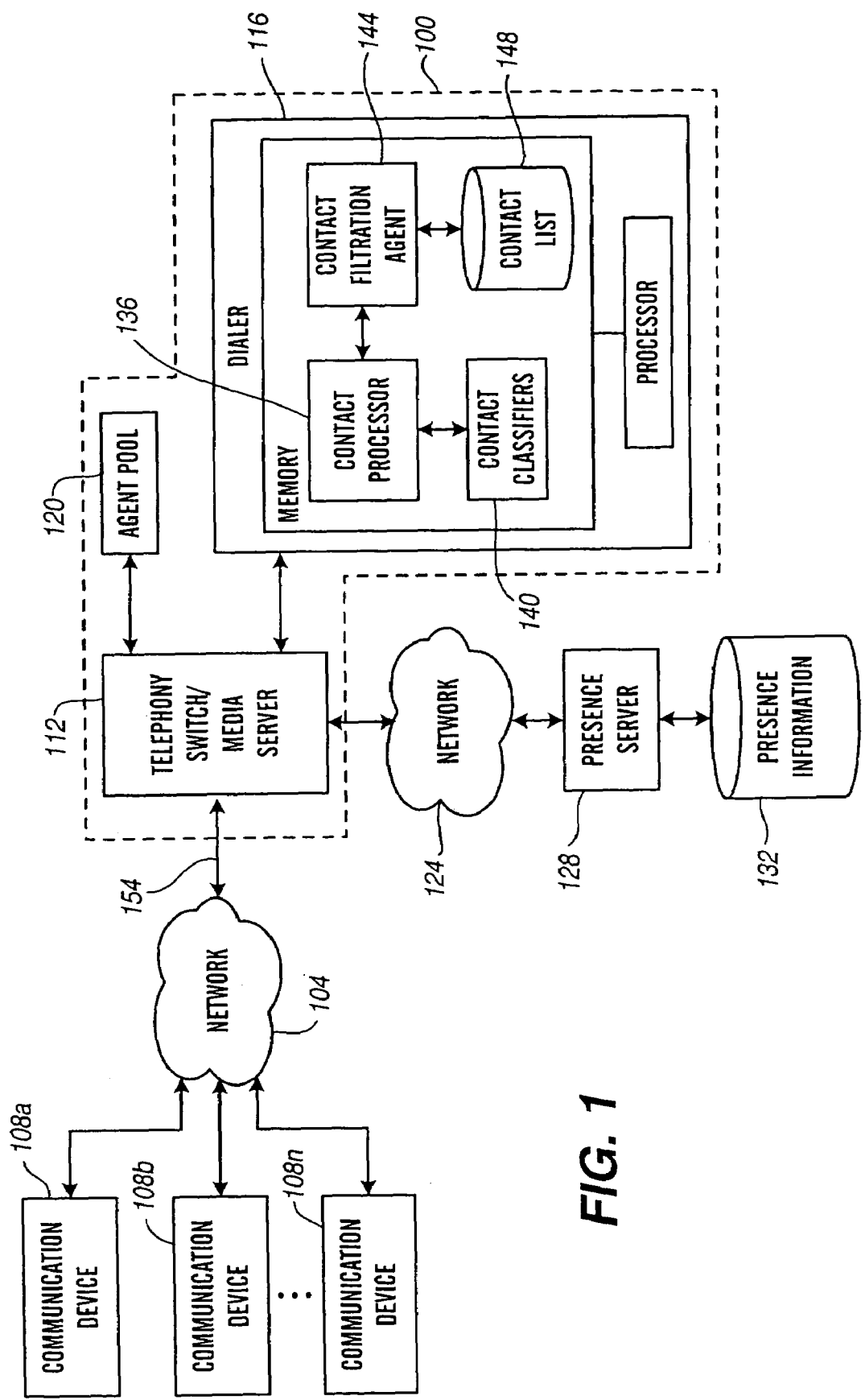
FIG. 1 is a block diagram depicting a first architecture embodiment of the present invention.

FIG. 1 is a block diagram illustrating a contact center 100 in accordance with a first embodiment of the present invention. The contact center 100 is coupled to a network 104 for use in placing contacts to any of a multitude of remote communication devices 108a, 108b, . . . , 108n. As illustrated, the contact center 100 includes: a telephony switch/media server 112, a dialer 116 (attached as an adjunct processor to the telephony switch/media server 112), and agent pool 120 (which is a pool of human agents, each with one or more communication interfaces or devices). During normal operation, contacts are placed from the contact center 100 to predetermined parties at the remote communication devices 108a, 108b, . . . , 108n to attempt to obtain a desired response from the contacted parties.

Networks 104 and 124 can each be any network capable of supporting communications. Some types of communication networks that can be used in accordance with the present invention include, for example, a satellite communication network, an optical fiber communication network, a local area network, a wide area network, a municipal area network, a private branch exchange network, the Internet, and/or a terrestrial wireless network. In one configuration, networks 104 and 124 are implemented as a packet-switched network, such as a data network, and/or a circuit-switched network, such as a public switched telephone network (PSTN).

Communication devices 108a–n can be any communication device suitable for the network to which they are connected. The communication devices 108a–n can include, for example, IP hardphones such as the Cisco I-BUTTON™ phone, IP softphones, Personal Digital Assistants or PDAs, Personal Computers or PCs, laptops, wired and wireless telephones, pagers, facsimile machines, modems, and video phones.

The presence server 128 and associated database 132 provide presence information to the contact center 100 in response to presence information queries. The presence server 128 and database 132 can be maintained by a private presence service associated with the party to be contacted, maintained by the party himself (such as on his Personal Computer or Laptop), maintained by the enterprise associated with the contact center and containing contact information and preferences received in prior contacts/transactions with the party, maintained by a state or regulatory agency (such as a DNC list) or a marketing association (such as the Direct Marketing Association or American Teleservices Association), and/or maintained by another enterprise. Presence information can contain contact information and preferences received directly or indirectly from the party. For example, the customer can specify "do not call me between 6 and 7 pm and after 8 pm at home", "call me on my mobile phone if I am out of the office", "only company X can call me at home", and "only companies offering service types A and B and selling product types C and D can call me at home".

The telephony switch/media server 112 can be any architecture for directing contacts to one or more communication devices. Illustratively, the switch/server 112 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; or Nortel Networks' IPConnect™. The switch or media server 112 typically is a stored-program-controlled system that conventionally includes interfaces (not shown) to external communication links, a communications switching fabric (not shown), service circuits (e.g., tone generators, announcement circuits, etc.) (not shown), memory (not shown) for storing control programs and data, and a processor (i.e., a computer) (not shown) for executing the stored control programs to control the interfaces and the fabric and to provide automatic contact-distribution functionality.

The agents within the agent pool 120 are preferably human employees of the contact center that are trained to solicit desired responses from the public. Each agent will normally be stationed at a computer terminal and wear a telephone headset during normal contact center operations. The agent may be notified beforehand when a contact has been placed for which the agent will be responsible once a live party answers the contact. In some cases, the dialer 116 will wait for confirmation from the agent before a contact is placed to ensure that the agent is ready.

The dialer 116, though illustrated as an adjunct processor, can be integrated into the telephony switch/media server and/or in each agent's communication device, as desired. The dialer can be any suitable predictive dialing system modified to perform the operations discussed herein. The dialer can be, for example, modified versions of the media servers EIC comm server™ of Interactive Intelligence, Xchange commserver™ and Enterprise Explorer and Digisoft Computer of EShare, Object Telephony Server™ of Buffalo International and adjunct processors or standalone dialers such as Predictive Dialing System™ of Avaya Inc., and the various dialers of Noble Systems. Alternatively, the dialer can be implemented as a pre-view dialer.

The dialer 116 comprises a contact processor 136, a pool of contact classifiers 140, a contact filtration agent 144, and a contact list 148.

The contact processor 136 manages the placement and processing of contacts and the recording of responses within the contact center 100. When the contact processor 136 determines that a contact needs to be placed to a predetermined party, it requests and receives contact information (e.g., telephone number and/or address) associated with the party from the contact filtration agent 144 and initiates the contact, such as by dialing a telephone number, to establish a communication connection with the party via network 104. At the same time, or slightly thereafter, the contact processor 136 (for a voice contact or communication) assigns a contact classifier from the contact classifier pool 140 to the contact for use in classifying audible signals received from the contacted party location during the contact. The contact classifier detects when the contact has been answered and then waits for an audible signal from the contacted party location. When an initial audible signal is detected (which typically includes the word "hello" or a similar greeting), the contact classifier assigned to the contact processes the signal to determine whether it has originated from a live party or from a machine, such as an automated phone answering device. When the contact classifier has completed processing of the audible signal, it delivers the results of the processing to the contact processor 136. If the contact classifier indicates that the contact was answered by a live party, the contact processor 136 immediately patches a waiting agent from the agent pool 120 into the connection to handle the remainder of the contact. If the contact classifier 140 indicates that the contact was not answered by a live party, the contact processor 136 terminates the contact or takes other action.

The contact list typically contains a list of party identifiers (such as names, addresses, customer key, customer identifier, account number, and the like) and contact information (e.g., one or more of contact numbers and/or addresses) for each identified party. The contact list can include other information for use by the agent, such as sales history, socioeconomic profiles, customer value to the business, customer segment or class (platinum, gold, silver, etc.), and the like.

The contact filtration agent 144 continually or periodically updates the contact list 148 to reflect presence information received from one or more designated sources and provides contact information to the contact processor 136 as needed. Typically, the updating is performed for each listed contact immediately before a contact is attempted with the listed contact. The contact filtration agent, in a preferred operational configuration, attempts to remove those contacts from the contact list having a low probability of success and/or for which there is a "no contact" request and, for those contacts eligible to be contacted, determines the contact number/address having the highest likelihood of realizing a live contact with the party and/or for which the party has indicated a preference.

Figure 2:
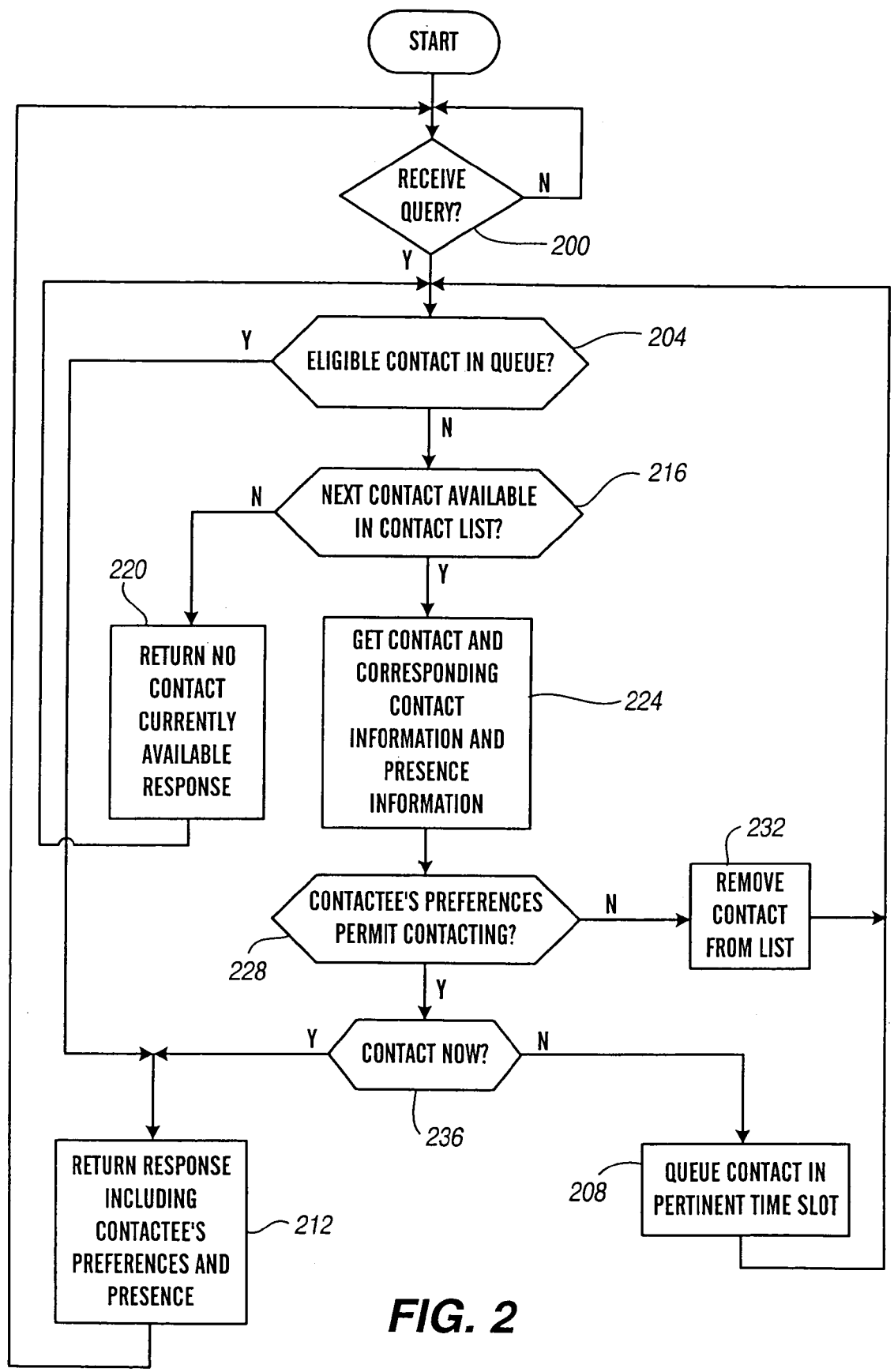
FIG. 2 is an operational flow chart according to a second embodiment of the present invention.

FIG. 2 is a flowchart illustrating a method for managing an outgoing contact within a contact center. With reference to FIG. 2, the contact processor 136, based on predetermined agent availability rules, determines that a contact is to be made to a target customer. In response, the contact processor 136 sends a query to the contact filtration agent 144 for an eligible contact from the contact list.

In decision diamond 200, the contact filtration agent 144 determines that it has received a query for an eligible contact.

In decision diamond 204, the contact filtration agent 144 determines whether or not there are any eligible contacts in the to-be-contacted queue (discussed below with respect to step 208). If there is a enqueued contact in a time slot that is eligible for contacting (e.g., the time associated with the time slot is expired), the contact filtration agent 144 proceeds to step 212 (discussed below). If there is no eligible contact in the queue, the contact filtration agent 144 proceeds to decision diamond 216.

In decision diamond 216, the contact filtration agent 144 determines whether or not there is a next contact available on the contact list. If there is no next contact on the contact list (every contact on the contact list has been processed), the contact filtration agent 144 in step 220 returns a response to the contact processor 136 indicating that no number is currently available for the contact. The agent 144 then returns to decision diamond 204 to await a next contact to become available. If there is a next contact, the contact filtration agent 144 in step 224 gets, from the contact list, the next contact on the contact list 148 and corresponding contact information, if any, and, from the presence server 128, corresponding presence information, if any. In one configuration, the contact filtration agent 144 sends a query to the presence server 128 for the presence information. The query identifies the person associated with the contact information and/or provides the contact information itself. Subject to privacy rules set by the presence server administrator or the party himself or herself, the presence server 128 retrieves pertinent presence information from the database 132 and responds to the contact filtration agent 144 with the retrieved presence information. The presence information retrieval is typically done at the time the contact is effected or immediately prior to effecting the contact (e.g., typically within about 60 minutes, more typically within about 15 minutes, and even more typically within about 5 minutes).

In decision diamond 228, the contact filtration agent 144 reads the party's preferences from the presence information and determines whether or not it is desirable to contact the party. For example, the party may have specified that he or she is not to receive any telemarketing contacts regardless of the purpose of the contact. The party may have specified that he or she is willing to receive telemarketing contacts only regarding certain subjects (e.g., certain product types, service types, charity types, relating to existing business arrangements (e.g., happy to take communication from my current bank but not other banks), bonus offers, and the like).

When the preferences indicate that it is undesirable to initiate a contact at any time, the contact filtration agent 144 removes the contact from the contact list in step 232 and returns to step 204. Optionally, the agent 144 can cause the reason(s) for removing the contact from the list to be recorded in a database. In this manner, campaign results can be tracked after the campaign is over (e.g., 5% of calls were not completed because the calls said do not call us). The reasons could also be used in later calls to the filtration agent (e.g., it could determine that person X is always busy at 3:00 p.m. and will take calls then).

When the preferences indicate that the contact is desirable, the contact filtration agent 144 proceeds to decision diamond 236.

In decision diamond 236, the contact filtration agent 144 determines, based on the presence information, whether or not it is desirable to contact the party now or later. For example, the presence information may indicate that the party is unavailable at the present time but is available later. The presence information may indicate that the party does not wish to take telemarketing contacts during specified time periods. The presence information may indicate that the party is not currently available or is willing to use media "X" as an alternative preference.

When it is not desirable to contact the party at the current time, the contact filtration agent 144 proceeds to step 208. In step 208, the contact filtration agent 144 queues the contact in a "to be contacted" queue in an appropriate time slot. The time slot can be any temporally-based data structure, such as a clock setting. The pertinent time slot can be based on the party's preferences or if the party is unavailable and no further information is provided the time slot can be selected arbitrarily according to predetermined rules. When a time slot is eligible for contacting, an interrupt signal can be generated by the database 148 to the contact filtration agent 144 so that the contact filtration agent can use that number when a query is received in decision diamond 204 rather than a next number from the contact list. The numbers in an eligible time slot are used in preference to the next number on the contact list 148 to maintain the queue length at acceptable levels.

The determination, based on presence information, of how to place a contact for a party is typically done each time the contact is about to be made because the presence information could have changed since the previous check. When it is desirable to contact the party at the current time, the agent contact filtration 144 proceeds to step 212. In step 212, the contact filtration agent 144 determines, based on the presence information, the party's preferences for contact mode and, for that mode, the correct telephone number or address of the party's communication device. For example, if the party has multiple telephone numbers for multiple communication devices the contact filtration agent selects a preferred communication device based on the presence information. If the party has multiple communication devices of differing types/modes, such as an email address, a wireless phone telephone number, a wired phone telephone number, and the like, the contact filtration agent selects the preferred communication device based on presence information. The contact filtration agent 144 then sends a response to the contact processor 136 with the pertinent contact information.

When the response is received by the contact processor 136, the contact processor 136 initiates the contact over a communication medium 154. The communication medium 154 can include a link within network 104. Next, for voice communications the communication medium is monitored using a contact classifier 140 to detect and classify signals from the contacted communication device. The contact classifier 140 is capable of processing a received signal to determine whether the signal originated from a live party or from a machine. The contact is then terminated or continued based on the output of the contact classifier 140.

Figure 3:
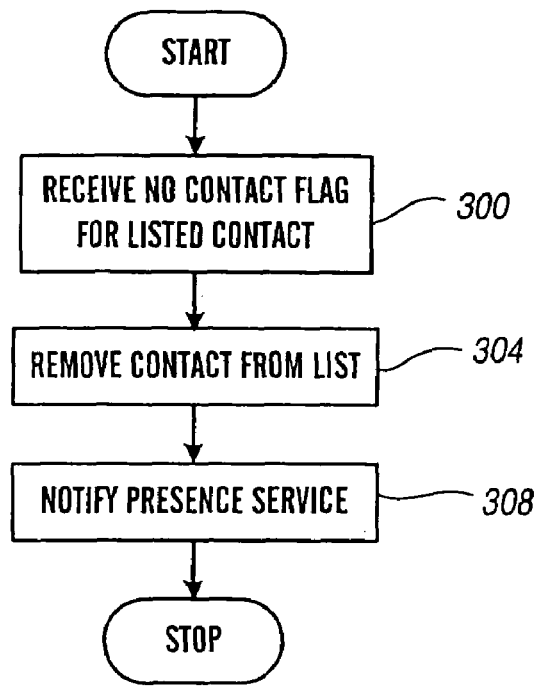
FIG. 3 is another operational flow chart according to a third embodiment of the present invention.

FIG. 3 shows an operation of the contact filtration agent 144 according to another embodiment of the present invention. The operation is performed in response to the contact processor 136 determining that a contact is to be removed from the list. This can be the case, for example, if the contacted party is a party other than the party to be contacted (e.g., wrong number), the contact information is no longer valid (e.g., number is disconnected), the contacted party has requested not to be contacted again by the contacting telemarketer (or any telemarketer), and the like. In that event, the contact processor 136 sends a request to the contact filtration agent 144 containing the contact information and having a "No Contact" flag set. The contact filtration agent 144 in step 300 receives the request and in step 304 effects removal of the contact from the contact list 148. The contact filtration agent 144 can forward in step 308 a suitable notification to the presence server 136 to update the presence information 132.

Figure 4:
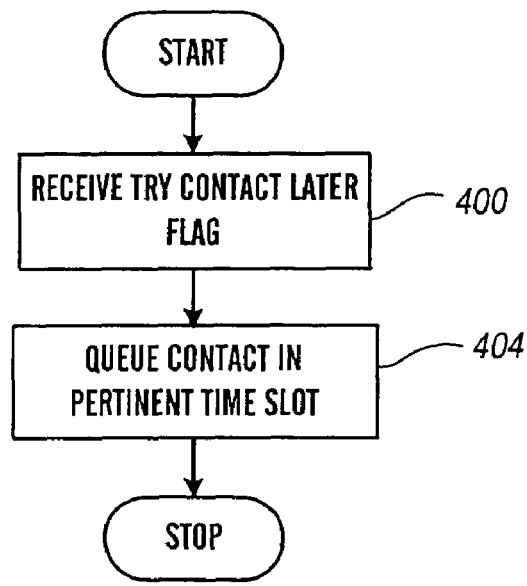
FIG. 4 is yet another operational flow chart according to a fourth embodiment of the present invention.

FIG. 4 shows an operation of the contact filtration agent 144 according to yet another embodiment of the present invention. The operation is performed in response to the contact processor 136 determining that an unsuccessful contact is to be tried again later. The processor 136 forwards a request to the contact filtration agent 144 in which a "Try Contact Later" flag is set. In step 400, the agent 144 receives the request and in step 404 queues the contact in the pertinent time slot in the "to be contacted" queue.

A number of variations and modifications of the invention can be used. It would be possible to provide for some features of the invention without providing others.

For example in one alternative embodiment, the contact list 148 includes, for each identified party, contact information other than or in addition to telephone numbers. For example, the contact information can be an electronic address, such as an email address, an instant message ID on an ISP such as Yahoo, and chat user ID. For each identified party, the list can have a plurality of contact numbers/addresses, each of which corresponds to a different communication device and/or contact modality.

In another alternative embodiment, the contact filtration agent 144 is implemented as hardware, e.g., a logic circuit, or as a combination of hardware and software.

In yet another embodiment, the dialer 116 can be implemented without a telephony switch/media server 112 and/or agent pool 120. The dialer can, for example, contact parties in the contact list and leave text and/or play pre-recorded voice messages, all without the involvement of a live agent.

In yet another embodiment, the dialer 116 is internationally applied and can comply with regulatory issues that vary country-by-country. For example, some countries permit sales calls to individuals between particular hours. The dialer can use presence information to determine the country to which the contact is to be made and, based upon a lookup table of rules to be applied on a country-by-country basis, determine whether to place the contact and, if not, place the call in the to-be-contacted queue.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A method, comprising:
   (a) receiving a query for a contact;
   (b) retrieving a selected contact from a contact list, the contact list identifying a plurality of parties to be contacted;
   (c) determining a country of residence of a first party associated with the selected contact, wherein the first party resides in a first country;
   (d) determining a first set of rules restricting contacts in the first country;
   (e) determining, based on the first set of rules, whether or not to contact the first party;
   and
   (f) when the first party is to be contacted, configuring the contact in accordance with the first set of rules.
2. The method of claim 1, further comprising:
   (g) receiving a further query for a contact;
   (h) retrieving a further selected contact from the contact list;
   (i) determining a country of residence of a second party associated with the further selected contact, wherein the second party resides in a second country;
   (j) determining a second set of rules restricting contacts in the second country, the first and second sets of rules being different from one another;
   (k) determining, based on the second set of rules, whether or not to contact the second party; and
   (l) when the second party is to be contacted, configuring the contact in accordance with the second set of rules.
3. The method of claim 1, wherein the first set of rules comprises restrictions on times when the first party may be contacted.
4. The method of claim 1, wherein the first set of rules globally governs contacts with residents of the first country.
5. The method of claim 1, wherein the contact list comprises first contact information associated with the selected contact and further comprising:
   (g) retrieving second contact information different from the first contact information and relating to the first party, wherein the second contact information comprises preferences selected by the first party, the preferences including a plurality of an acceptable time period to place the contact, a contact mode to be used for the contact, and a specific communication device associated with the contact to which the contact is to be placed; and
   (h) determining, based on the second contact information and at least one of at or immediately before the placement of the contact, whether or not to contact the first party and wherein the first and second contact information is different.
6. The method of claim 1, further comprising:
   (g) retrieving presence information associated with the first party; and
   (h) determining, based on the presence information, whether or not to contact the first party, wherein the presence information comprises a plurality of contact preferences of the first party, second contact information for the first party, current contact availability of the first party, and registration information, information regarding the accessibility of an endpoint device associated with the first party, the endpoint's telephone number or address, the recency of use of the endpoint device by the first party, and recency of authentication by the first party to a network component.
7. The method of claim 6, wherein the first party is associated with a plurality of endpoint devices, wherein the preferences include a specific one of the endpoint devices, and wherein the specific endpoint device is at least one of IP hardphone, IP softphone, wired telephone, wireless telephone, Personal Digital Assistant or PDA, facsimile machine, Personal Computer or PC, laptop, and video phone.

8. The method of claim 1, wherein the contact list has previously been scrubbed against a Do Not Call list and wherein in step (c):
when the first party is not to be contacted at the present time, performing at least one of the following steps:
removing the first party from the contact list; and
queuing the first party in a to-be-contacted queue to be contacted later.

9. A method, comprising:
(a) receiving a query for a contact;
(b) retrieving a selected contact from a set of contacts, the set of contacts identifying a plurality of parties to be contacted;
(c) determining a governed geographical region of residence of a first party associated with the selected contact, wherein the governed geographical region is governed by a governmental entity and wherein the first party resides in a first governed geographical region;
(d) determining a first set of rules restricting contacts in the first governed geographical region, the first set of rules universally applying to residents of the first governed geographical region;
(e) determining, based on the first set of rules, whether or not to contact the first party; and
(f) when the first party is to be contacted, configuring the contact in accordance with the first set of rules.

10. The method of claim 9, further comprising:
(g) receiving a further query for a contact;
(h) retrieving a further selected contact from the set of contacts;
(i) determining a governed geographical region of residence of a second party associated with the further selected contact, wherein the second party resides in a second governed geographical region;
(j) determining a second set of rules restricting contacts in the second governed geographical region, the first and second sets of rules being different from one another;
(k) determining, based on the second set of rules, whether or not to contact the second party; and
(l) when the second party is to be contacted, configuring the contact in accordance with the second set of rules.

11. The method of claim 9, wherein the first set of rules comprises restrictions on times when the first party may be contacted and wherein the governed geographical regions are countries.

12. The method of claim 10, wherein the first governed geographical region is a first country and the second governed geographical region is a second country.

13. The method of claim 12, wherein the contact list comprises first contact information associated with the selected contact and further comprising:
(g) retrieving second contact information different from the first contact information and relating to the first'party, wherein the second contact information comprises preferences selected by the first party, the preferences including a plurality of an acceptable time period to place the contact, a contact;mode to be used for the contact, and a specific communication device associated with the contact to which the contact is to be placed; and
(h) determining, based on the second contact information and at least one of at or immediately before the placement of the contact, whether or not to contact the first party and wherein the first and second contact information is different.

14. The method of claim 12, further comprising:
(g) retrieving presence information associated with the first party; and
(h) determining, based on the presence information, whether or not to contact the first party, wherein the presence information comprises a plurality of contact preferences of the first party, second contact information for the first party, current contact availability of the first party, and registration information, information regarding the accessibility of an endpoint device associated with the first party, the endpoint's telephone number or address, the recency of use of the endpoint device by the first party, and recency of authentication by the first party to a network component.

15. The method of claim 14, wherein the first party is associated with a plurality of endpoint devices, wherein the preferences include a specific one of the endpoint devices, and wherein the specific endpoint device is at least one of IP hardphone, IP softphone, wired telephone, wireless telephone, Personal Digital Assistant or PDA, facsimile machine, Personal, Computer or PC, laptop, and video phone.

16. The method of claim 12, wherein the set of contacts has previously been scrubbed against a Do Not Call list.

17. A computer readable medium comprising processor executable instructions for performing the steps of claim 9.

18. A dialer, comprising:
a contact list, the contact list identifying a plurality of parties to be contacted; and
a contact filtration agent operable to (a) receive a query for a contact; (b) retrieve a selected contact from a contact list, the contact list identifying a plurality of parties to be contacted; (c) determine a governed geographical region of residence of a first party associated with the selected contact, wherein the governed geographical region is governed by a governmental entity and wherein the first party resides in a first governed geographical region; (d) determine a first set of rules restricting contacts in the first governed geographical region, the first set of rules universally applying to residents of the first governed geographical region; (e) determine, based on the first set of rules, whether or not to contact the first party; and (f) when the first party is to be contacted, configure the contact in accordance with the first set of rules.

19. The dialer of claim 18, wherein the contact filtration agent is further operable, to (g) receive a further query for a contact; (h) retrieve a further selected contact from the contact list; (i) determine a governed geographical region of residence of a second party associated with the further selected contact, wherein the second party resides in a second governed geographical region; (j) determine a second set of rules restricting contacts in the second governed geographical region, the first and second sets of rules being different from one another; (k) determine, based on the second set of rules, whether or not to contact the second party; and (l) when the second party is to be contacted, configure the contact in accordance with the second set of rules.

20. The dialer of claim 18, wherein the first set of rules comprises restrictions on times when the first party may be contacted and wherein the governed geographical regions are countries.

21. The dialer of claim 19, wherein the first governed geographical region is a first country and the second governed geographical region is a second country.

22. The dialer of claim 18, wherein the contact list comprises first contact information associated with the selected contact and wherein the agent is further operable to (g) retrieve second contact information different from the first contact information and relating to the'first party, wherein the second contact information comprises preferences selected by the first party, the preferences including a plurality of an acceptable time period to place the contact, a contact mode to be used for the contact, and a specific communication device associated with the contact to which the contact is to be placed and (h) determine, based on the second contact information and at least one of at or immediately before the placement of the contact, whether or not to contact the first party and wherein the first and second contact information is different.

23. The dialer of claim 18, wherein the agent is further operable to (g) retrieve presence information associated with the first party and (h) determine, based on the presence information, whether or not to contact the first party, wherein the presence information comprises a plurality of contact preferences of the first party, second contact information for the first party, current contact availability of the first party, and registration information, information regarding the accessibility of an endpoint device associated with the first party, the endpoint's telephone number or address, the recency of use of the endpoint device by the first party, and recency of authentication by the first party to a network component.

24. The dialer of claim 23, wherein the first party is associated with a plurality of endpoint devices, wherein the preferences include a specific one of the endpoint devices, and wherein the specific endpoint device is at least one of IP hardphone, IP softphone, wired telephone, wireless telephone, Personal Digital Assistant or PDA, facsimile machine, Personal Computer or PC, laptop, and video phone.

25. The dialer of claim 19, wherein the contact list has previously been scrubbed against a Do Not Call list.

26. A computer readable medium comprising processor executable instructions to perform the steps of claim 1.

* * * * *